Jan. 26, 3,558,218

Filed Dec. 1, 1967

| F = 100 mm | | BACK FOCUS = 78.69mm | | f = 9.2 |
|---|---|---|---|---|
| LENS | REFRACTIVE INDEX | ABBE NUMBER | SURFACE RADIUS | CLEAR APERTURE | THICKNESS AND SPACING |
| I | 1.613 | 58.6 | $R_1 = +14.70$ | 19.99 | $D_I = 4.36$ |
| | | | $R_2 = +60.11$ | 18.44 | $S_I = 3.30$ |
| II | 1.673 | 32.2 | $R_3 = -2324.9$ | 11.96 | $D_{II} = 0.79$ |
| | | | $R_4 = +13.00$ | 10.19 | $S_{II} = 4.28$ |
| III | 1.620 | 36.4 | $R_5 = +31.87$ | 8.64 | $D_{III} = 1.48$ |
| | | | $R_6 = -293.57$ | 8.53 | $S_{III} = 3.82$ |

INVENTOR.
David S. Grey
BY Brown and Mikulka
and
Gerald L. Smith
ATTORNEYS

United States Patent Office 3,558,218
Patented Jan. 26, 1971

3,558,218
THREE-ELEMENT TELEPHOTO
OBJECTIVE LENS
David S. Grey, Lexington, Mass., assignor to Polaroid Corporation, Cambridge, Mass., a corporation of Delaware
Filed Dec. 1, 1967, Ser. No. 687,167
Int. Cl. G02b 7/04, 9/16
U.S. Cl. 350—226   15 Claims

ABSTRACT OF THE DISCLOSURE

Telephoto triplet objective lens systems are disclosed wherein the frontal element facing the longer conjugate is a positive meniscus lens of relatively high power and thickness. The intermediate element is a negative dispersing lens having a concave surface facing in the direction of the shorter conjugate and whose opposed surface has a radius of curvature which (in absolute value) is substantially greater than the focal length. The Abbe value of the optical medium comprising the rearward element on the side of the shorter conjugate is less than 0.70 of the Abbe value of the frontal element.

---

Figures 1, 2:
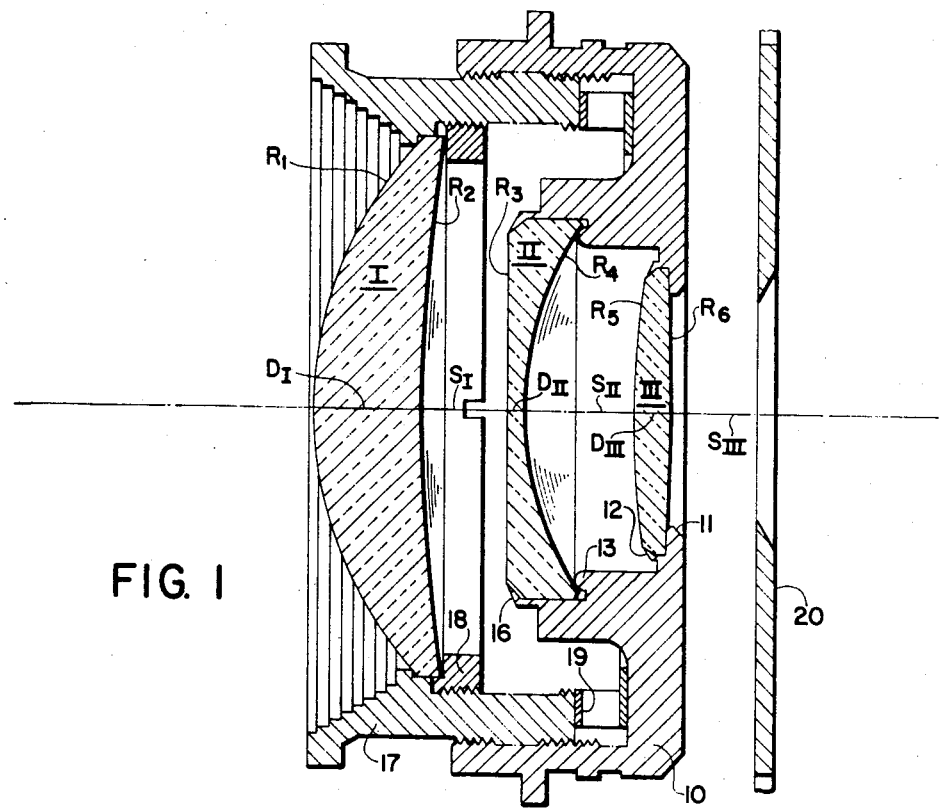

This invention relates to lens systems, and more particularly to improved telephoto triplet objectives for use with photographic devices.

Relatively low priced photographic cameras fabricated through high volume production techniques, have continually enjoyed a wide acceptance by the consumer public. To preserve their low unit cost, these cameras may be configured to have rigid non-folding housings supporting a simple and inexpensive objective lens a fixed distance from an exposure plane. Where broadened photographic capabilities are desired, particularly those affording variable focusing, the rigid housing arrangement, for the most part, is discarded in favor of expansive bellows systems or the like. The latter structures, while more costly than rigid housings, permit the axial translation required in focusing relatively simple objective lens configurations.

The present invention provides a variable focus objective lens system amenable to relatively low unit cost production techniques and which is compatible with rigid camera structures having a fixed back focal length. Characterized as an objective triplet, the system advantageously permits front element focusing with minimal axial translation of the front focusing element. A large range of focusing adjustments is possible with relatively small axial translations of the front element through the use of a relatively high power front element. Further, inasmuch as the triplet is telephoto in nature, the lens arrangement of the invention derives a design flexibility allowing camera structures of reduced size.

The chromatic aberrations otherwise encountered with the use of such a relatively higher powered frontal lens element are compensated through selection of widely differing Abbe number values for the optical media of the lens elements of the system. In this regard, a substantial variation in Abbe number values will be observed to exist between the serially disposed first or frontal and last lens elements of the objective.

The telephoto triplet lens system is designed to provide progressively smaller clear apertures of its three lens elements from the longer conjugate to the shorter conjugate. The lens system aperture may be positioned rearwardly of the lens and the entire objective structure may be fabricated separately from the diaphragm and the shutter of the camera. A significant flexibility in fabrication techniques may be gained from such structuring. For instance, the modular flexibility of the separate components permits simplified removal and replacement procedures. Should lens defects be encountered during the course of manufacturing inspection, only the lens, as opposed to the entire exposing mechanism, need be removed from the camera for replacement.

The triplet lens objective of the present invention is particularly characterized in comprising, in the direction of light rays through the objective proceeding from the longer conjugate to the shorter conjugate, a condensing meniscus lens followed by a dispersive lens, followed, in turn, by a condensing lens having surfaces of unequal curvature. A diaphragm may be advantageously positioned rearwardly of and at the shorter conjugate side of the final condensing lens.

The intermediately situate dispersive lens is a negative lens whose surface facing the larger conjugate is formed having a radius of curvature (compared in the absolute value) of substantially larger dimension than the focal length of the objective.

To compensate chromatic aberrations, the rearward condensing lens element is formed from an optical medium having an Abbe value of less than 0.70 of the Abbe value of the frontal positive meniscus lens.

Still another object is to provide a novel photographic objective system having an overall length, i.e., from the first lens vertex to the focal plane which is less than the focal length of the system. In addition to the advantageously small overall length, the telephoto lens system of the invention is further characterized in developing an image area of greater diameter than the focal length of the system. The latter aspect will be seen as most unique for a triplet objective lens system of the telephoto variety.

Other objects of the invention will in part be obvious and will in part appear hereinafter.

The invention accordingly comprises a telephoto lens system possessing the features, properties, and relation of elements which will be exemplified in the detailed disclosure to follow.

For a fuller understanding of the nature and objects of the invention, reference should be had to the following description of preferred embodiments thereof taken in connection with the accompanying drawings wherein:

FIG. 1 is an axial sectional view of a mounted triplet objective lens embodying the invention; and FIG. 2 is a compilation of numerical data pertaining to an example of the lens system of the invention.

In FIG. 1, a structure for mounting the objective lens system of the invention is portrayed. It will be immediately apparent to those skilled in the art of lens fabrication that such mountings lend themselves to high volume assembly techniques. In the figure, a lens mount 10 is pictured supporting lens elements II and III in appropriately spaced axial alignment. Lens element III nests against beveled aperture rim 11 and is secured thereagainst by a frontal rim 12. Rim 12 may be framed against the lens element using conventional spacing techniques or the like.

In similar fashion, the lens element II is positioned against an integral rim 13. The element is secured by a rim 16, formed by spinning techniques. Of course, many other techniques for attaching these lens elements will be apparent to those versed in the art.

Threadedly engaged at the integral surface of lens mount 10 is a bezel 17 within which is mounted the positive meniscus element I. Element I is secured to the bezel by a threaded ring member 18. Axial translation of the element I is effected by rotation of bezel 17. The bezel is shown positioned for rotation against a biasing force developed through an annular spring member 19. The relatively slight forces imposed by spring 19 develop a holding friction between mount 10 and bezel 17 preventing any play or looseness at this threaded interconnection and holding the front element in any position to which it is adjusted. A diaphragm 20 is shown in position rearwardly of the entire lens structure.

For the purpose of providing specific examples of a telephoto triplet lens objective or lens system as described and illustrated herein, and with references to the lens system or objective shown in the figures of the drawing, the following tabulations set forth physical values applicable to FIG. 2 and related lens arrangements, based, for convenience, upon a focal length, F, of 100 millimeters (mm.).

EXAMLE I

F=100 mm.  
f9.2  
Semi-field angle 28°  
Back focus=78.69 mm.

| Lens | Refractive Index | Abbe Number | Surface radius | Clear aperture | Thickness and spacing |
|---|---|---|---|---|---|
| I | 1.613 | 5.86 | $R_1=+14.70$ | 19.99 | $D_I=4.36$ |
|   |       |      | $R_2=+60.11$ | 18.44 | $S_I=3.30$ |
| II | 1.673 | 32.2 | $R_3=-2324.9$ | 11.96 | $D_{II}=0.79$ |
|    |       |      | $R_4=+13.00$ | 10.19 | $S_{II}=4.28$ |
| III | 1.620 | 36.4 | $R_5=+31.87$ | 8.64 | $D_{III}=1.48$ |
|     |       |      | $R_6=-293.57$ | 8.53 | $S_{III}=3.82$ |

EXAMPLE II

F=100 mm.  
f9.2  
Back focus=78.41 mm.

| Lens | Refractive Index | Abbe Number | Surface radius | Clear aperture | Thickness and spacing |
|---|---|---|---|---|---|
| I | 1.616 | 56.3 | $R_1=14.29$ | 19.39 | $D_I=4.68$ |
|   |       |      | $R_2=66.03$ | 18.73 | $S_I=2.52$ |
| II | 1.678 | 32.2 | $R_3=\alpha$ | 13.62 | $D_{II}=1.15$ |
|    |       |      | $R_4=12.55$ | 11.97 | $S_{II}=4.72$ |
| III | 1.621 | 36.6 | $R_5=30.27$ | 8.60 | $D_{III}=1.40$ |
|     |       |      | $R_6=\alpha$ | 8.52 | $S_{III}=0$ |

EXAMPLE III

F=100 mm.  
f9.2  
Back focus=78.61 mm.

| Lens | Refractive Index | Abbe Number | Surface radius | Clear aperture | Thickness and spacing |
|---|---|---|---|---|---|
| I | 1.616 | 56.3 | $R_1=12.99$ | 19.18 | $D_I=4.68$ |
|   |       |      | $R_2=62.33$ | 18.50 | $S_I=2.46$ |
| II | 1.678 | 32.2 | $R_3=\alpha$ | 13.60 | $D_{II}=1.15$ |
|    |       |      | $R_4=12.05$ | 10.90 | $S_{II}=4.56$ |
| III | 1.621 | 36.6 | $R_5=28.38$ | 8.62 | $D_{III}=1.40$ |
|     |       |      | $R_6=\alpha$ | 8.54 | $S_{III}=0$ |

EXAMPLE IV

F=100 mm.  
f9.2  
Back focus=78.81 mm.

| Lens | Refractive Index | Abbe Number | Surface radius | Clear aperture | Thickness and spacing |
|---|---|---|---|---|---|
| I | 1.616 | 56.3 | $R_1=14.29$ | 19.33 | $D_I=4.61$ |
|   |       |      | $R_2=61.48$ | 18.68 | $S_I=2.63$ |
| II | 1.678 | 32.2 | $R_3=\alpha$ | 13.53 | $D_{II}=1.15$ |
|    |       |      | $R_4=12.30$ | 10.90 | $S_{II}=4.35$ |
| III | 1.621 | 36.6 | $R_5=27.93$ | 8.64 | $D_{III}=1.40$ |
|     |       |      | $R_6=\alpha$ | 8.57 | $S_{III}=0$ |

EXAMPLE V

F=100mm.  
f17  
Back Focus=80.64 mm.

| Lens | Refractive Index | Abbe Number | Surface radius | Clear aperture | Thickness and spacing |
|---|---|---|---|---|---|
| I | 1.4917 | 57.16 | $R_1=13.53$ | 17.28 | $D_I=5.74$ |
|   |        |       | $R_2=42.81$ | 13.17 | $S_I=1.07$ |
| II | 1.5917 | 32.89 | $R_3=302.27$ | 11.86 | $D_{II}=5.74$ |
|    |        |       | $R_4=13.69$ | 8.84 | $S_{II}=1.07$ |
| III | 1.5917 | 32.89 | $R_5=26.19$ | 5.54 | $D_{III}=1.69$ |
|     |        |       | $R_6=206.82$ | 4.75 | $S_{III}=0$ |

In the above tabulations, the lens elements are indicated by Roman numerals; R indicates the radii of the lens surfaces; D the thickness of the elements measured along the optical axis of the triplet; and S the air space between the elements measured along the optical axis of the triplet. Spacing $S_I$ is variable to permit focusing, however, values are assigned it in the tabulations representing a focus at infinity. The column "Refractive Index" of the tables refers to the refractive indices of the optical media of the elements as measured for the yellow "D" line of the sodium arc. The column "Abbe Number" refers to the Abbe index of each lens (nu value), the quotient of the refractive index minus 1 and the base dispersion $(N_F-N_C)$.

Of particular interest, Example V will be seen to provide a lens system wherein all lens elements may be fashioned from plastic materials. For instance, lens I may be formed from methyl methacrylate, while lenses II and III may be fashioned from styrene. Thusly fabricated, the system readily lends itself to lower cost production techniques while preserving adequate optical quality.

As has been indicated earlier, in order to minimize the axial translation of the frontal positive meniscus lens I, while still providing for an adequate variable focus, the lens I is configured having a relatively higher power. This power relationship may be evidenced from a comparison of the varying thicknesses D of the lenses across the system. In order to compensate for chromatic aberration otherwise resulting from the use of a relatively high power lens element I, the optical medium comprising lens element III is selected as less than 0.70 of that of the optical medium comprising element I, i.e., $$\frac{\nu_{III}}{\nu_I}<0.70$$

Under this criterion, it will be apparent that the shape of lens element III may vary somewhat from that indicated in the example.

The intermediate lens element II is seen from the tabulation to be a negative lens whose front radius of curvature $R_3$ is (in absolute value) substantially greater than the focal length.

The tabulation of FIG. 2 shows a physical length or total thickness of the objective $$(l=D_I+S_I+D_{II}+S_{II}+D_{III})$$

as 14.21 mm. and a back focal length of 78.69 mm.

Summing these lengths, the overall length deriving from the first example becomes 92.90 mm., a figure lower than the focal length selected at 100 mm. In all embodiments of the objective, this will remain the case. The examples presented also reveal the progressively diminishing clear aperture dimensions progressing from the larger conjugate side to the shorter side. This characteristic will permit the efficient positioning of a diaphragm at distance $S_{III}$ from lens element III.

The lens system will additionally be seen to be characterized in developing an image area having a diameter of value greater than its focal length. Adequate satisfaction of the Petzval sum is accomplished without excessive curvature of the lens elements.

Since certain changes may be made in the above objective lens system without departing from the scope of the invention herein involved, it is intended that all matter contained in the above description or shown in the accompanying drawing shall be interpreted as illustrative and not in a limiting sense.

What is claimed is:

1. A telephoto triplet objective lens system comprising: three serially arranged coaxially and axially spaced lenses including, in the direction of light rays entering the objective from the side of the longer conjugate toward the side of the shorter conjugate;
a condensing meniscus lens having a concave surface facing in the direction of the shorter conjugate;
a dispersive lens; and
a condensing lens having surfaces of different curvature with the more sharply curved surface facing in the direction of the longer conjugate, having an Abbe value less than 0.70 of the Abbe value of the said condensing meniscus lens, and having a power substantially less than that of the said condensing meniscus lens;
said lens system being characterized in having an effective focal length substantially longer than the combined dimensions of the back focal length and total thickness of the objective.

2. The telephoto triplet objective lens system of claim 1 including means defining for each of said spaced lenses apertures which are progressively smaller in the direction of said shorter conjugate.

3. The telephoto triplet objective lens system of claim 1 wherein the surface of said dispersive lens facing in the direction of said longer conjugate has a radius of curvature of absolute value substantially greater than the effective focal length of said lens system.

4. The telephoto triplet objective lens system of claim 1 including means defining a lens system aperture smaller than the aperture of said condensing lens and spaced on the short conjugate side of said condensing lens.

5. The telephoto triplet objective lens system of claim 1 wherein said condensing meniscus lens is movably mounted to accomplish focusing for said objective lens system.

6. The telephoto objective of claim 5 wherein said condensing meniscus lens is polymerized methyl methacrylate and the second and third lenses are made from polymerized styrene.

7. The telephoto objective lens of claim 1 having a useful image area with a diameter at least equal to the equivalent focal length of said objective lens.

8. A telephoto triplet objective lens system having the following characteristics as related to a focal length of 100 millimeters and wherein $S_I$ represents a spacing for focusing the system at infinity:

LENS I

| Surface radius, mm. | Thickness and spacing, mm. | Abbe Number | Refractive Index |
|---|---|---|---|
| $R_1 = +14.70$ | $D_I = 4.36$ | 58.6 | 1.613 |
| $R_2 = +60.11$ | $S_I = 3.30$ | | |

LENS II

| Surface radius, mm. | Thickness and spacing, mm. | Abbe Number | Refractive Index |
|---|---|---|---|
| $R_3 = -2324.9$ | $D_{II} = 0.79$ | 32.2 | 1.673 |
| $R_4 = +13.00$ | $S_{II} = 4.28$ | | |

LENS III

| Surface radius, mm. | Thickness and spacing, mm. | Abbe Number | Refractive Index |
|---|---|---|---|
| $R_5 = +31.87$ | $D_{III} = 1.48$ | 36.4 | 1.620 |
| $R_6 = -293.57$ | | | |

9. A telephoto triplet objective lens system having the following characteristics as related to a focal length of 100 millimeters and wherein $S_I$ represents a spacing for focusing the system at infinity:

LENS I

| Surface radius, mm. | Thickness and spacing, mm. | Abbe Number | Refractive Index |
|---|---|---|---|
| $R_1 = 14.29$ | $D_I = 4.68$ | 56.3 | 1.616 |
| $R_2 = 66.03$ | $S_I = 2.52$ | | |

LENS II

| Surface radius, mm. | Thickness and spacing, mm. | Abbe Number | Refractive Index |
|---|---|---|---|
| $R_3 = \alpha$ | $D_{II} = 1.15$ | 32.2 | 1.678 |
| $R_4 = 12.55$ | $S_{II} = 4.72$ | | |

LENS III

| Surface radius, mm. | Thickness and spacing, mm. | Abbe Number | Refractive Index |
|---|---|---|---|
| $R_5 = 30.27$ | $D_{III} = 1.40$ | 36.6 | 1.621 |
| $R_6 = \alpha$ | | | |

10. A telephoto triplet objective lens system having the following characteristics as related to a focal length of 100 millimeters and wherein $S_I$ represents a spacing for focusing the system at infinity:

LENS I

| Surface radius, mm. | Thickness and spacing, mm. | Abbe Number | Refractive Index |
|---|---|---|---|
| $R_1 = 12.99$ | $D_I = 4.68$ | 56.3 | 1.616 |
| $R_2 = 62.33$ | $S_I = 2.46$ | | |

LENS II

| Surface radius, mm. | Thickness and spacing, mm. | Abbe Number | Refractive Index |
|---|---|---|---|
| $R_3 = \alpha$ | $D_{II} = 1.15$ | 32.2 | 1.678 |
| $R_4 = 12.05$ | $S_{II} = 4.56$ | | |

LENS III

| Surface radius, mm. | Thickness and spacing, mm. | Abbe Number | Refractive Index |
|---|---|---|---|
| $R_5 = 28.38$ | $D_{III} = 1.40$ | 36.6 | 1.621 |
| $R_6 = \alpha$ | | | |

11. A telephoto triplet objective lens system having the following characteristics as related to a focal length of 100 millimeteres and wherein $S_I$ represents a spacing for focusing the system at infinity:

LENS I

| Surface radius, mm. | Thickness and spacing, mm. | Abbe Number | Refractive Index |
|---|---|---|---|
| $R_1 = 14.29$ | $D_I = 4.61$ | 56.3 | 1.616 |
| $R_2 = 61.48$ | $S_I = 2.63$ | | |

LENS II

| Surface radius, mm. | Thickness and spacing, mm. | Abbe Number | Refractive Index |
|---|---|---|---|
| $R_3 = \alpha$ | $D_{II} = 1.15$ | 32.2 | 1.678 |
| $R_4 = 12.30$ | $S_{II} = 4.35$ | | |

LENS III

| Surface radius, mm. | Thickness and spacing, mm. | Abbe Number | Refractive Index |
|---|---|---|---|
| $R_5 = 27.93$ | $D_{III} = 1.40$ | 36.6 | 1.621 |
| $R_6 = \alpha$ | | | |

12. A telephoto triplet objective lens system having the following characteristics as related to a focal length of 100 millimeteres and wherein $S_I$ represents a spacing for focusing the system at infinity:

LENS I

| Surface radius, mm. | Thickness and spacing, mm. | Abbe Number | Refractive Index |
|---|---|---|---|
| $R_1=13.53$ | $D_I=5.74$ | 57.16 | 1.4917 |
| $R_2=42.81$ | $S_I=1.07$ | | |

LENS II

| | | | |
|---|---|---|---|
| $R_3=302.27$ | $I=5.74$ | 32.89 | 1.5917 |
| $R_4=13.69$ | $S_{II}=1.07$ | | |

LENS III

| | | | |
|---|---|---|---|
| $R_5=26.19$ | $D_{III}=1.69$ | 32.89 | 1.5917 |
| $R_6=206.82$ | | | |

13. An optical telephoto objective corrected for chromatic aberration comprising three air spaced elements of which the front and rear elements are positive and the middle element is negative; being characterized in that the Abbe value of the said rear element is less than 0.70 of the Abbe value of the said front element and that the front element has a power substantially higher than the said rear element; said objective being further characterized in having an effective focal length substantially longer than the combined dimensions of its back focal length and its total thickness, and having a useful image area extending to a diameter approximately equal to said effective focal length.

14. The optical objective of claim 13 in which the refractive index of said rear element is greater than the refractive index of said front component.

15. The optical objective of claim 13 further characterized in that the middle element has a front radius of curvature substantially greater than the effective focal length of the objective.

References Cited
UNITED STATES PATENTS

| 2,440,088 | 4/1948 | Grey | 350—212 |
| 2,279,372 | 4/1942 | Herzberger | 350—226 |
| 2,388,869 | 11/1945 | Reiss | 350—226X |
| 2,699,700 | 1/1955 | Klemt | 350—226X |
| 2,728,266 | 12/1955 | Tolle | 350—226X |

JOHN K. CORBIN, Primary Examiner

U.S. Cl. X.R.

350—206—255